March 17, 1931.  T. S. McDOWELL  1,796,607
CHAIN CLIP
Filed April 22, 1929
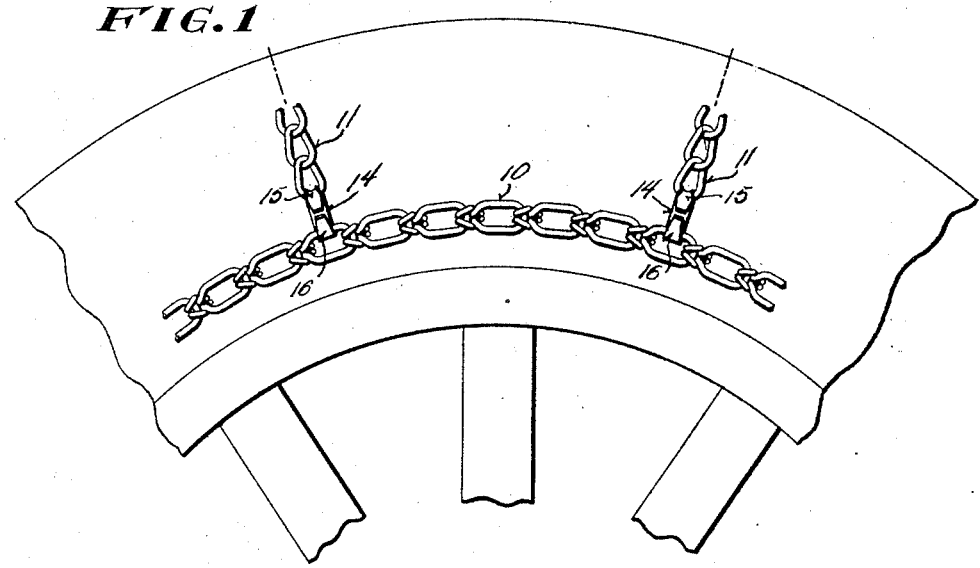
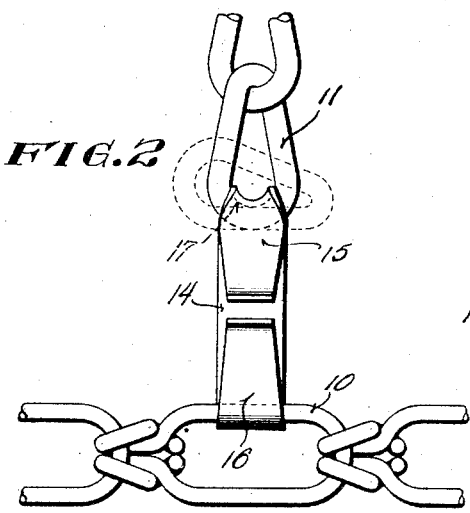
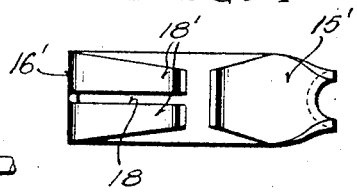
Inventor
Thomas S. McDowell
By
Attorney Patented Mar. 17, 1931

1,796,607

UNITED STATES PATENT OFFICE

THOMAS S. McDOWELL, OF WAUWATOSA, WISCONSIN

CHAIN CLIP

Application filed April 22, 1929. Serial No. 356,937.

This invention relates to chain clips for anti-skid tire chains or the like.

The primary object of the present invention is the provision of novel and improved means for connecting the tread and rim portions of an anti-skid device.

A more specific object is the provision of a novel and improved clip which will permit the ready attachment and removal of tread chains for purposes of replacement or repair, without necessitating the use of tools or the removal of the entire chain from the wheel.

Other more specific objects and advantages will appear from the following description of an illustrative embodiment of the present invention.

In the drawings:—

Figure 1 is a fragmentary side elevational view of an automobile wheel and tire upon which is mounted a non-skid device whose tread chains are removably attached to the rim chains by means of clips constructed in accordance with the teachings of the present invention.

Fig. 2 is a plan view of a portion of a rim chain and a portion of a tread chain connected by the chain clip of the present invention.

Fig. 3 is a fragmentary side elevational view of the chain clip shown in Fig. 2.

Fig. 4 is a top plan view of a chain clip of slightly modified form.

One form of clip embodying the present invention is shown in Figures 1, 2 and 3. In Figure 1 the usual anti-skid device comprising a pair of rim chains 10 (only one of which is shown) connected by tread chains 11. A plurality of chain clips 14 comprising the subject matter of the present invention serve as removable connecting means between the ends of the tread chains 11 and the side chains 10. The chain clips 14 are formed from a piece of flat spring steel whose ends 15 and 16 are bent back upon the body portion to form snap hooks. The end 15 is slightly crimped to form a curved seat 17 which conforms to the curvature of the end link of the tread chain 11. By crimping the end 15, I have found that the clip resists wear by virtue of the large contact area. A further advantage of crimping lies in the fact that the tensile strength of the clip is not reduced as would be the case were portions of this end merely cut away for the purpose of better receiving the end link of the tread chain 12. The other end 16 of the clip presents a relatively large surface contact area to the straight side of a link in the side chain 10 by virtue of the width of the clip.

Should a tread chain 11 wear excessively or break under any condition, a new tread chain may readily replace the worn or broken one without necessitating the removal of the anti-skid device from the tire or without the necessity of employing special tools to accomplish the repair. This important advantage is gained by the use of the chain clips hereinabove described.

The removal of a worn or broken tread chain is accomplished by merely freeing the snapping engagement between the clip 14 and the rim chain 10. The hook 15 is freed from snapping engagement with the tread chain in a similar manner after the end link thereof has been turned through 90° into substantially the position shown in dotted lines in Figure 2.

The embodiment of the invention shown in Figure 4 is similar in many respects to the other form illustrated except that it is somewhat wider to adapt it to heavy duty service. It includes a snap hook 15' at one end to receive the tread chain in the manner previously described. The other end of the clip is provided with a longitudinal cut 18 which divides the snap hook 16' into a pair of spring fingers 18'. I have found this form of snap hook to be highly advantageous by reason of the greater width of the clip. Were it not for the longitudinal cut the strength of the large hook would be so great that it would make the removal of the clip from the chain extremely difficult if not impossible without the aid of tools. The split finger however does not materially reduce the strength of the hook although it facilitates the removal of the clip from the chain.

From the foregoing description of the embodiment of the present invention it will readily be seen that a chain clip has been provided which will permit the ready removal and replacement of worn or broken tread chains from the anti-skid device without necessitating the removal of the entire device from the wheel or without the use of special tools to accomplish the repair.

Various changes may be made in the embodiment of the invention hereinabove specifically described without departing from or sacrificing any of the advantages of the invention as defined in the appended claims.

I claim:—

1. A chain clip for releasably connecting the rim and tread chains of an anti-skid device, said clip comprising a flat body portion fashioned of spring steel and bent to provide snap hooks at opposite ends thereof, the bight of one of said hooks being crimped to reduce the width thereof and to provide a curved bearing surface to match the end of a narrow terminal link of the tread chain.

2. A chain clip for releasably connecting the rim and tread chains of an anti-skid device, said clip comprising a flat body portion fashioned of spring steel and bent to provide snap hooks at opposite ends thereof, the bight of one of said hooks being crimped to reduce the width thereof and to provide a curved bearing surface to match the contour of the end of a narrow terminal link of the tread chain, the other of said hooks having a bight to provide an extended seat for the straight side of a link in the rim chain, and said last named hook being longitudinally split to facilitate application and removal of said clip to or from the rim chain.

3. A chain clip for releasably connecting the rim and tread chains of an anti-skid device, said clip comprising a flat body portion fashioned of spring steel and bent to provide snap hooks at opposite ends thereof, one of said hooks having a bight to provide an extended seat for the straight side of a link in the rim chain, and said last named hook being longitudinally split to facilitate application and removal of said clip to or from the rim chain.

In witness whereof, I hereunto subscribe my name this 19 day of April, 1929.

THOMAS S. McDOWELL.